United States Patent
Krishna et al.

(10) Patent No.: US 10,260,552 B1
(45) Date of Patent: Apr. 16, 2019

(54) TRANSMISSION CABLE LOCKING DEVICE FOR VEHICLES

(71) Applicants: Hyundai Motor Company, Seoul (KR); Kia Motors Corporation, Seoul (KR)

(72) Inventors: Aluri Vamsee Krishna, Hyderabad (IN); Eun Sik Kim, Gwangmyeong-si (KR); Hari Gothra Haridwarkar, Hyderabad (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/889,029

(22) Filed: Feb. 5, 2018

(30) Foreign Application Priority Data

Nov. 30, 2017 (IN) .............................. 201711043058

(51) Int. Cl.
*F16C 1/22* (2006.01)
*F16C 1/14* (2006.01)
*F16H 61/36* (2006.01)

(52) U.S. Cl.
CPC ............... *F16C 1/22* (2013.01); *F16C 1/145* (2013.01); *F16H 61/36* (2013.01)

(58) Field of Classification Search
CPC .. F16C 1/10; F16C 1/102; F16C 1/103; F16C 1/105; F16C 1/14; F16C 1/145; F16C 1/22; F16H 61/36
See application file for complete search history.

(56) References Cited

U.S. PATENT DOCUMENTS

| | | | | |
|---|---|---|---|---|
| 4,185,515 A * | 1/1980 | Webb | ................... | F16B 21/086 16/2.1 |
| 4,762,017 A * | 8/1988 | Jaksic | ....................... | F16C 1/22 188/196 B |
| 5,584,212 A * | 12/1996 | Wild | ........................ | F16C 1/14 403/319 |
| 6,490,947 B2 * | 12/2002 | Burger | ................... | F16C 1/105 248/56 |
| 7,044,018 B2 | 5/2006 | Sanchez | | |
| 7,334,498 B2 * | 2/2008 | Yokomori | .............. | F16C 1/226 254/231 |

FOREIGN PATENT DOCUMENTS

| | | | | |
|---|---|---|---|---|
| DE | 9304462 U1 * | 5/1993 | .............. | E05B 9/12 |
| KR | 20-0359882 Y1 | 8/2004 | | |
| KR | 10-1075191 B1 | 10/2011 | | |

* cited by examiner

*Primary Examiner* — Adam D Rogers
(74) *Attorney, Agent, or Firm* — Morgan, Lewis & Bockius LLP (57) ABSTRACT

A transmission cable locking device for vehicles may include a plurality of opposing locking clips rotating with respect to each other wherein the rotation determines a grip or release state of a transmission cable; a locking band provided between the locking clips and providing interconnecting tension between the locking clips; and a housing accommodating the locking clips and the locking band, and in which a hinge shaft is formed wherein the locking clips are coupled to the internal surface to rotate.

12 Claims, 11 Drawing Sheets

FIG. 9B

TRANSMISSION CABLE LOCKING DEVICE FOR VEHICLES

CROSS-REFERENCE(S) TO RELATED APPLICATIONS

The present application claims priority to Indian Patent Application No. 201711043058 filed on Nov. 30, 2017, the entire contents of which are incorporated herein for all purposes by the present reference.

BACKGROUND OF THE INVENTION

Field of the Invention

The present invention relates to a transmission cable locking device for vehicles. More particularly, the present invention relates to a transmission cable locking device for vehicles which may lock the transmission cable to a socket by a simple operation.

Description of Related Art

Generally, a Transmission Gear Shift (TGS) cable (hereinafter, transmission cable) connected with a transmission gear is connected with a stick disposed at a driver's seat of a manual transmission vehicle. A driver may operate the stick to perform gear transmission.

The present transmission cable connects the transmission lever in the vehicle with the transmission, and operates the transmission by operating the transmission lever.

The transmission cable is combined with a base bracket with which the transmission lever is connected. For the present connection, a socket is located at an end of the transmission cable and engaged with a dead-end of the base bracket. The transmission cable inserted into the socket pushes or pulls a locking button provided at the socket in upper and lower directions, and the locking button is locked by an outer spring surrounding an outside of the socket, thereby the transmission cable is coupled with or released from the socket.

However, the conventional combination structure of the transmission cable and the socket is formed by a button operation using a user's fingers, but the operation of pushing and pulling the button may be difficult because the button is large compared with the user's fingers. Further, the outer spring is expensive, noise may be generated during the operations of combining and/or releasing, and play, or backlash, may be formed between the locking button and the spring, therefore fixation of the transmission is not stable.

Resultantly, a passenger's safety and vehicle performance may not be secured by unstable fixation of the transmission cable.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission cable locking device for vehicles which may fix a transmission cable to a socket by a simple operation.

A transmission cable locking device for vehicles according to an exemplary embodiment of the present invention includes a plurality of opposing locking clips rotating with respect to each other wherein the locking clips grip or release a transmission cable; a locking band provided between the locking clips and providing interconnecting tension between the locking clips; and a housing accommodating the locking clips and the locking band, and in which a hinge shaft is formed wherein the locking clips are coupled to the internal surface to rotate.

The locking clips may include a clip core coupled to the hinge shaft; a handle portion extended from the clip core and rotatably provided to push and pull the locking clips with respect to each other; a trapping hook engaged to an external circumferential surface to fix the clip core; and an engagement portion to fix the external circumferential surface of the transmission cable between the locking clips.

A tension groove may be formed with an opening shape and is provided at the clip core to limit the movement range of the locking clip.

A thread of a screw may be provided at the internal circumferential surface of the engagement portion.

The locking band may include an elastic material.

An end portion of the locking band may be inserted inside of the clip core.

The housing may include a socket accommodating the locking clips and the locking band; a tension stopper inserted into the tension groove and provided on an internal surface of the socket to be deformed corresponding to a rotation of the locking clips; and a trapping block provided at an external circumferential surface of the housing and configured to be engaged with the trapping hook wherein the locking clips are fixed at the housing.

The tension stopper may include an elastic material.

Pressure that the tension stopper applies to the internal surface of the tension groove, wherein the locking clips rotate with respect to each other on the hinge shaft to release the transmission cable, may be greater than the tension applied to the locking band.

Pressure that the tension stopper applies to the rear surface of the locking clips, wherein the locking clips rotate with respect to each other on the hinge shaft to grip the transmission cable, may be smaller than the tension applied to the locking band.

At a circumference of the hinge shaft, an internal spring which is elastically deformed, wherein a predetermined distance between the locking clips and the internal surface of the housing is maintained when the locking clips are coupled to the hinge shaft, may be provided.

At an end portion of the hinge shaft, a fixation block is provided so that the locking clips are not released from the hinge shaft when the locking clips are coupled to the hinge shaft.

According to an exemplary embodiment of the present invention, a fixation mechanism becomes simple and workability may be improved since the transmission cable may be fixed at the socket by a simple operation.

Also, cost may be reduced by removing an external spring, and noise generation may be prevented during operation.

Also, stability and vehicle performance may be improved by stable fixation between the transmission cable and socket.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, in exemplary embodiments, since like reference numerals designate like elements having the same configuration, various exemplary embodiments is representatively described, and in other exemplary embodiments, only configurations different from the various exemplary embodiments will be described.

It will be understood that when an element including a layer, film, region, or substrate is referred to as being "on" another element, it can be directly on the other element or intervening elements may also be present.

Now, a transmission cable locking device for vehicles according to an exemplary embodiment of the present invention will be described with reference to FIG. 1 and FIG. 2.

Figure 1:
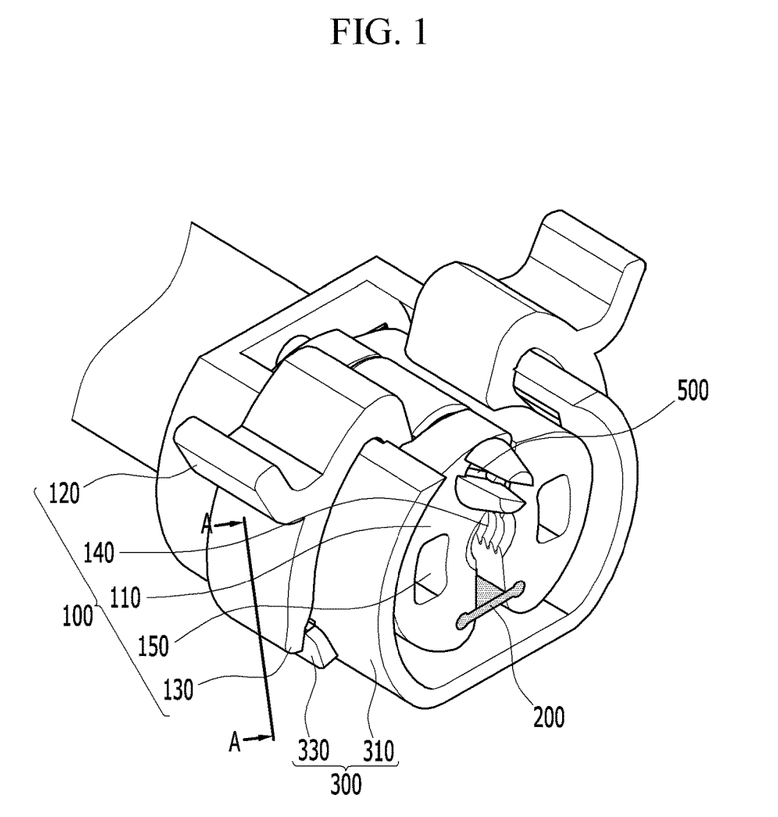
FIG. 1 is a schematic view illustrating a transmission cable locking device for vehicles according to an exemplary embodiment of the present invention.
Figure 2:
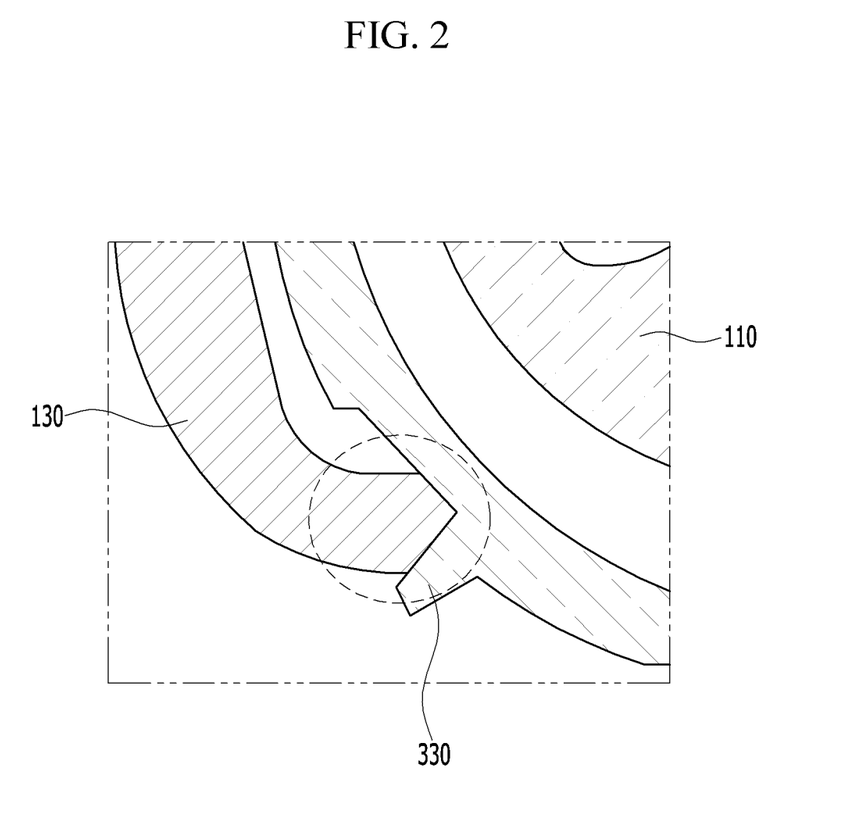
FIG. 2 is a cross-sectional view taken along line A-A of FIG. 1.

FIG. 1 is a schematic view illustrating a transmission cable locking device for vehicles according to an exemplary embodiment of the present invention, and FIG. 2 is a cross-sectional view taken along line A-A of FIG. 1.

As shown in FIG. 1, a transmission cable locking device for vehicles according to an exemplary embodiment of the present invention includes a plurality of opposing locking clips 100 that grip or release a transmission cable C, a locking band 200 provided between the locking clips 100, and a housing 300 accommodating the locking clips 100 and the locking band 200.

The locking clips 100 are disposed to oppose each other and rotate with respect to each other wherein the locking clips 100 grip or release the transmission cable C. The locking band 200 is provided at a lower side of the locking clips 100 to be inserted therein and provides interconnecting tension between the locking clips 100. A hinge shaft 340 provided to rotate in a state that the locking clips 100 are coupled to the internal surface of the housing 300.

Each locking clips 100 includes a clip core 110 rotatably inserted and coupled to the hinge shaft 340, a handle portion 120 extended from an upper side of the clip core 100 and rotatably provided to push and pull the locking clips 100 with respect to each other, a trapping hook 130 engaged to an external circumferential surface and configured to fix the clip core 110, and an engagement portion 140 configured to fix the external circumferential surface of the transmission cable C between the locking clips 100.

Further, a tension groove 150 formed as an opening shape is provided at a center portion of the clip core 110 and configured to limit a movement range of the locking clip 100. Further, a thread of a screw is provided at the internal circumferential surface of the engagement portion 140 wherein the transmission cable may be fixed stably between the engagement portion 140.

The locking band 200 may include an elastic material, and an end portion of the locking band 200 may be inserted into a lower side of the clip core 110. The locking band 200 may be a square shape.

The housing 300 includes a socket 310 accommodating the locking clips 100 and the locking band 200, a tension stopper 320, and a trapping block 330.

The tension stopper 320 may be inserted into the tension groove 150 formed at the clip core 110 and provided as a protruding shape on an internal surface of the socket 310 to be deformed corresponding to a rotation of the locking clips 100.

Figure 3:
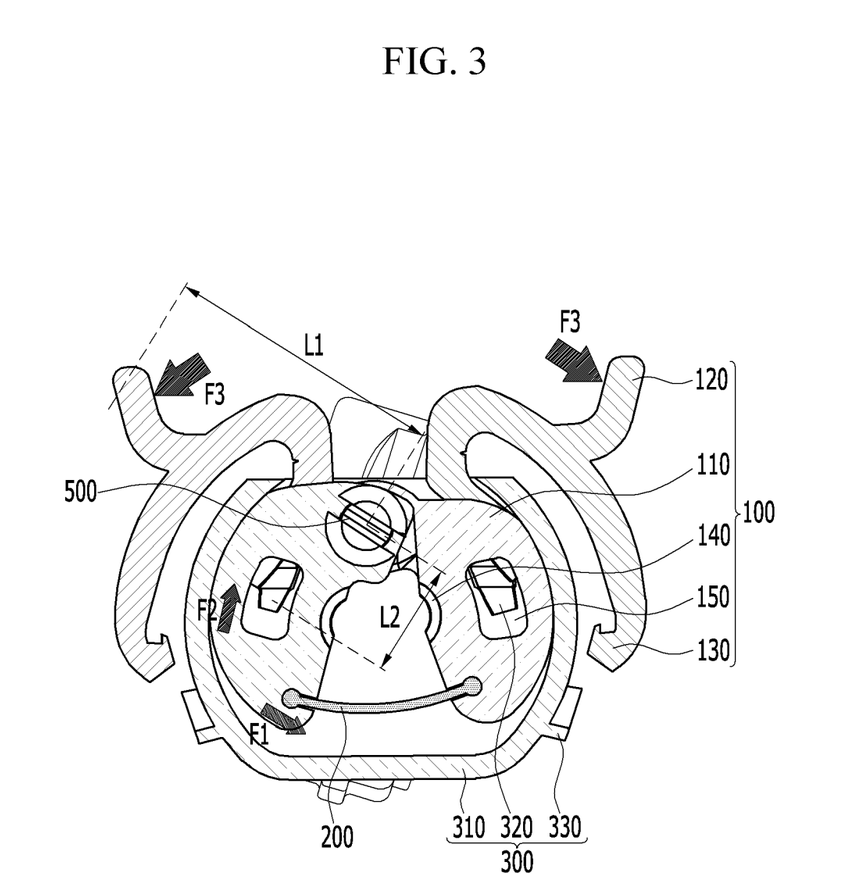
FIG. 3 is a front cross-sectional view illustrating a release state of a transmission cable locking device for vehicles according to an exemplary embodiment of the present invention.

The trapping block 330 may be provided at an external circumferential surface of the housing 300 and configured to be engaged with the trapping hook 130 wherein the locking clips 100 are fixed at the housing 300. As shown in FIG. 3, when a user pushes the handle portion 120 toward an external direction, the locking clips 100 rotate with respect to each other wherein the upper sides of the locking clips 100 become remote from each other. At the present time, the trapping hook 130 moves toward the trapping block 330 of the housing 300, and the trapping hook 130 is engaged with the trapping block 330 wherein the locking clips 100 may be fixed stably at the housing 300.

Figure 4:
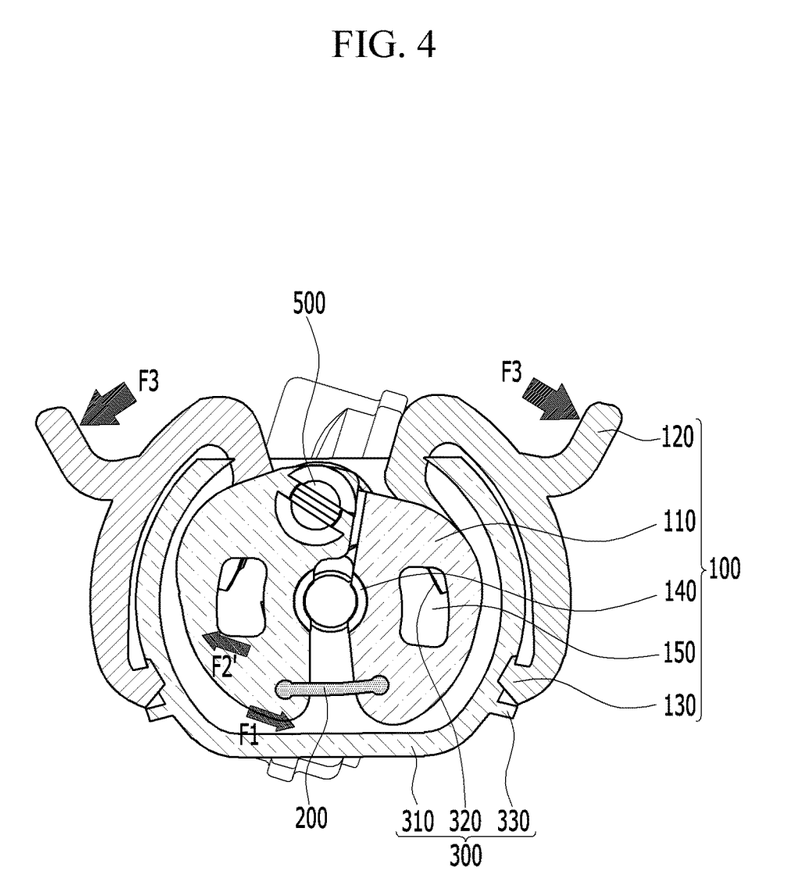
FIG. 4 is front cross-sectional view illustrating a gripping state of a transmission cable locking device for vehicles according to an exemplary embodiment of the present invention.
Figure 5:
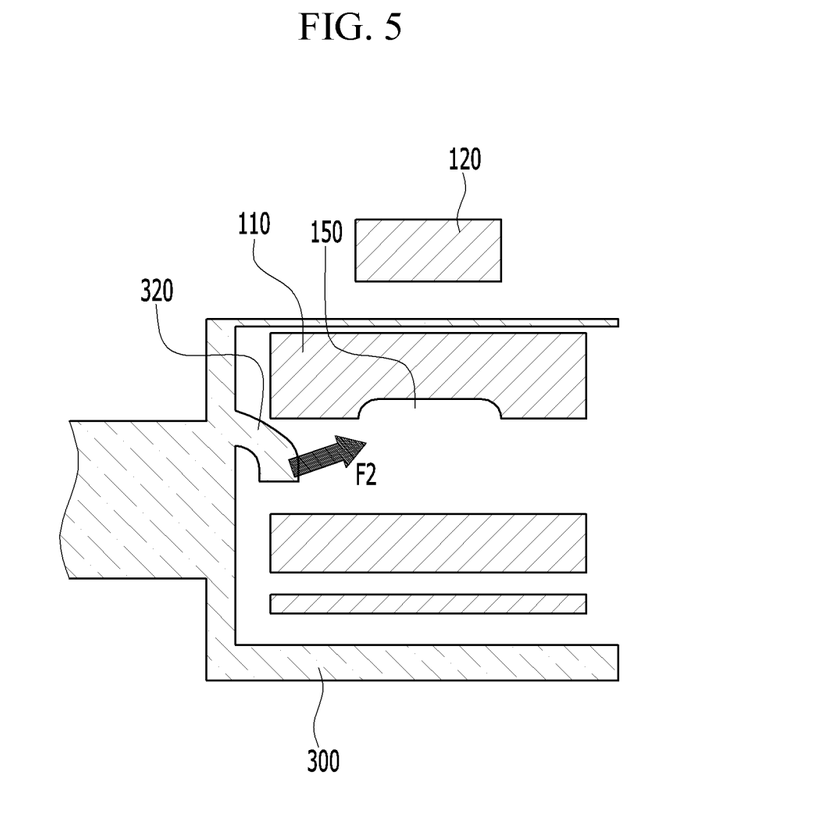
FIG. 5 is a side cross-sectional view illustrating a release state of a transmission cable locking device for vehicles according to an exemplary embodiment of the present invention.
Figure 6:
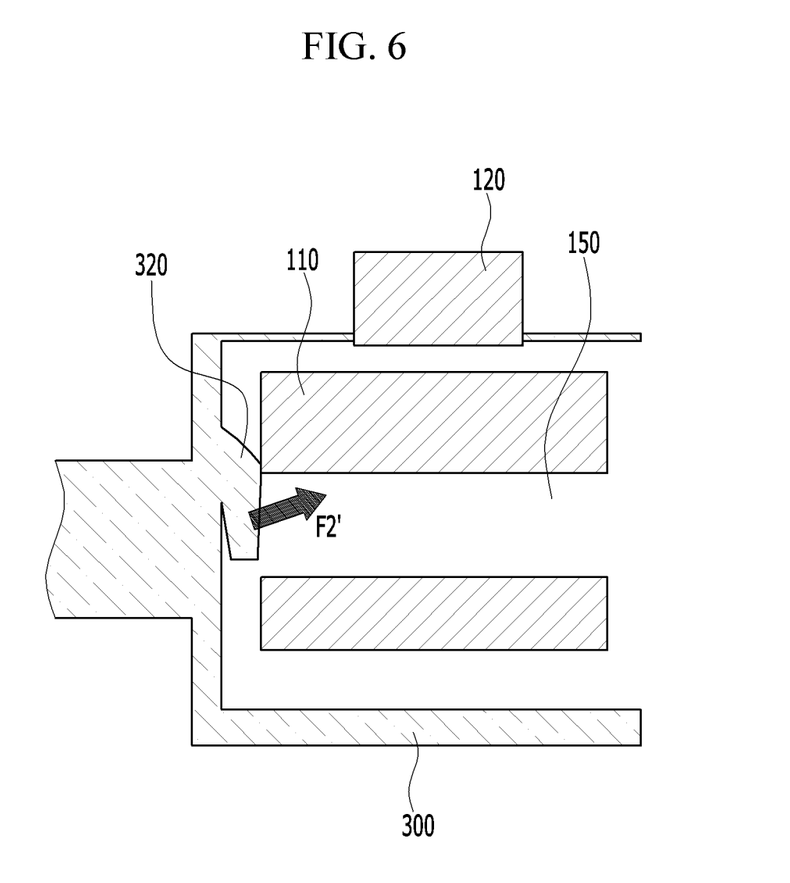
FIG. 6 is a side cross-sectional view illustrating a gripping state of a transmission cable locking device for vehicles according to an exemplary embodiment of the present invention.

FIG. 3 is a front cross-sectional view illustrating a release state of a transmission cable locking device for vehicles according to an exemplary embodiment of the present invention, FIG. 4 is front cross-sectional view illustrating a gripping state of a transmission cable locking device for vehicles according to an exemplary embodiment of the present invention, FIG. 5 is a side cross-sectional view illustrating a release state of a transmission cable locking device for vehicles according to an exemplary embodiment of the present invention, and FIG. 6 is a side cross-sectional view illustrating a gripping state of a transmission cable locking device for vehicles according to an exemplary embodiment of the present invention.

Referring to FIG. 3 and FIG. 5, firstly, in a release state of a transmission cable C of a transmission cable locking device for vehicles according to an exemplary embodiment of the present invention, the locking clips 100 rotate with respect to each other on the hinge shaft 340 wherein lower sides of the clip core 110 become remote from each other. Tension F1 is applied toward a center portion of the locking band 200 at the locking band 200 of which both end portions are inserted into the lower portion of the clip core 110. Also, the tension stopper 320 is inserted into the tension groove 150, and the tension stopper 320 applies pressure F2 wherein the lower sides of the locking clips 100 are spread in a state that the tension stopper 320 contacts with the tension groove 150. The tension stopper 320 may include an elastic material.

At the present time, the pressure F2, in which the lower sides of the locking clips 100 are spread, is greater than tension F1 applied to the locking band 200 toward the center portion of the locking band 200, therefore the state that the lower sides of the locking clips 100 are spread occurs. In other words, the pressure F2 that the tension stopper 320 applies to the internal surface of the tension groove 150 wherein the locking clips 100 rotate with respect to each other on the hinge shaft 340 to release the transmission cable C, is greater than the tension F1 applied to the locking band 200.

Meanwhile, a distance L1 from an end portion of the handle portion 120 to a center portion of the fixation block 500 is greater than a distance L2 from the center portion of the fixation block 500 to a center portion of the tension groove 150. Therefore, the user may easily push the handle portion 120 outwardly to make the lower sides of the clip core 110 become close with each other.

Referring to FIG. 4 and FIG. 6, the user pushes the locking clip 100 toward an external direction by a certain pressure F3 wherein the transmission cable locking device for vehicles grips the transmission cable C. The locking clips 100 rotate with respect to each other on the hinge shaft 340 wherein the lower sides of the clip core 110 become close with each other. Tension F1 is applied toward a center portion of the locking band 200. Also, the tension stopper 320 inserted into the tension groove 150 escapes from the tension groove 150 and contacts with the rear surface of the clip core 100, and pushes the clip core 100 outwardly by a certain pressure F2'. At the present time, the pressure F1 applied to the locking band 200 toward a center portion of the locking band 200 is greater than the pressure F2' pushing the clip core 110 outwardly by contacting with the rear surface of the clip core 110, therefore the lower sides of the locking clips 100 become close with each other and the transmission cable C is gripped. In other words, the pressure F2' that the tension stopper 320 applies to the rear surface of the locking clips 100 wherein the locking clips 100 rotate with respect to each other on the hinge shaft 340 to grip the transmission cable C is smaller than the tension F1 applied to the locking band 200.

Further, the trapping hook 130 provided at the locking clips 100 is engaged with the trapping block 330 of the housing 300 wherein the locking clips 100 are stably fixed at the housing 300.

Figure 7:
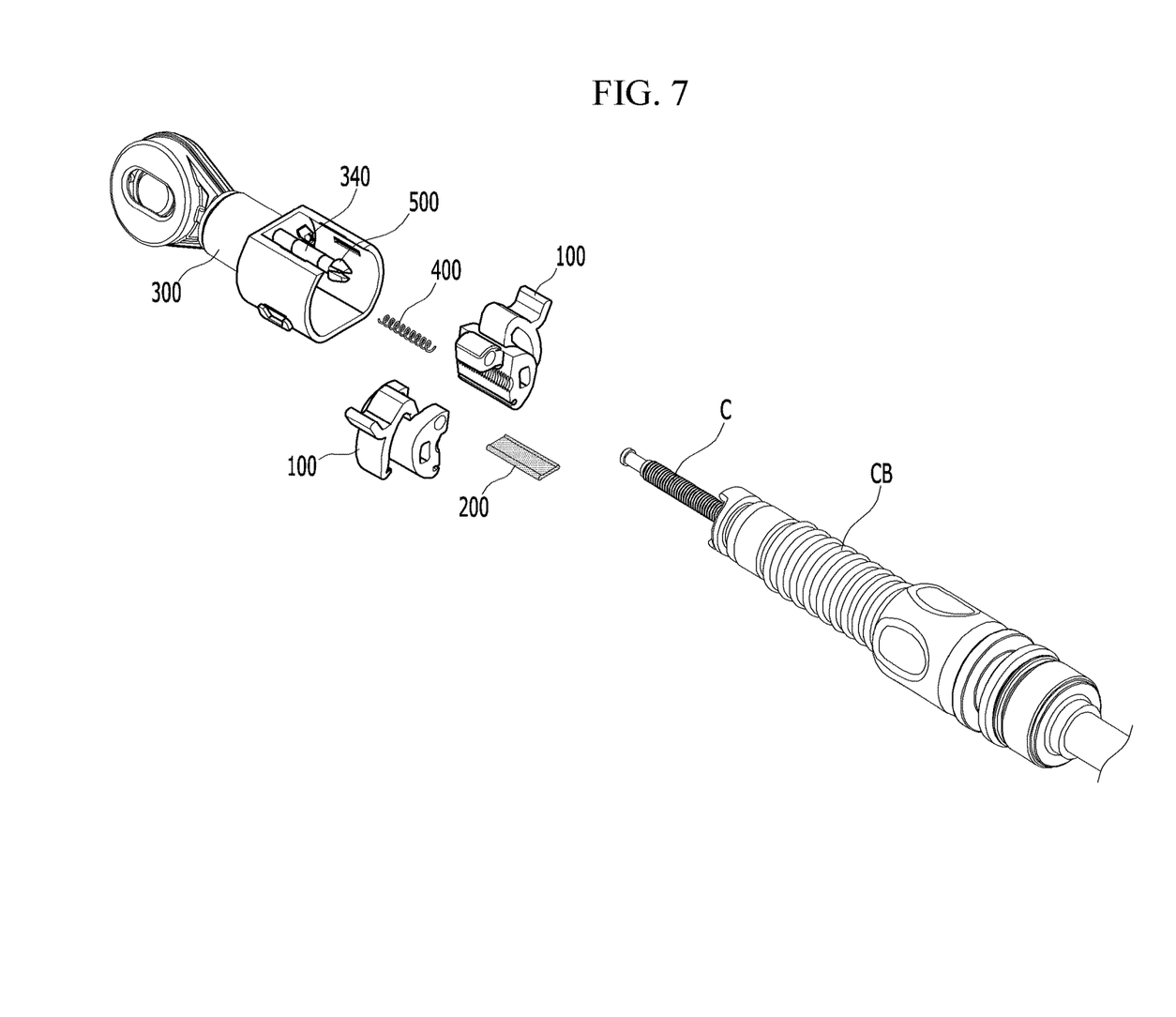
FIG. 7 is an exploded perspective view of a transmission cable locking device for vehicles according to an exemplary embodiment of the present invention.

FIG. 7 is an exploded perspective view of a transmission cable locking device for vehicles according to an exemplary embodiment of the present invention.

Referring to FIG. 7, at a circumference of the hinge shaft 340, an internal spring 400 which is elastically deformed wherein a predetermined distance between the locking clips 100 and the internal surface of the housing 300 is maintained when the locking clips 100 are coupled to the hinge shaft 340 is provided.

Further, the locking clips 100 are connected to the hinge shaft 340 as an opposite shape, and both end portions of the locking band 200 are inserted into the lower side of the locking clips 100.

At an end portion of the hinge shaft 340, a fixation block 500 may be provided so that the locking clips 100 are not released from the hinge shaft 340 when the locking clips 100 are coupled to the hinge shaft 340.

The transmission cable C may be gripped at or released from the engagement portion between the locking clips 100 in a state of being combined with a cable boot CB.

Figure 8A:
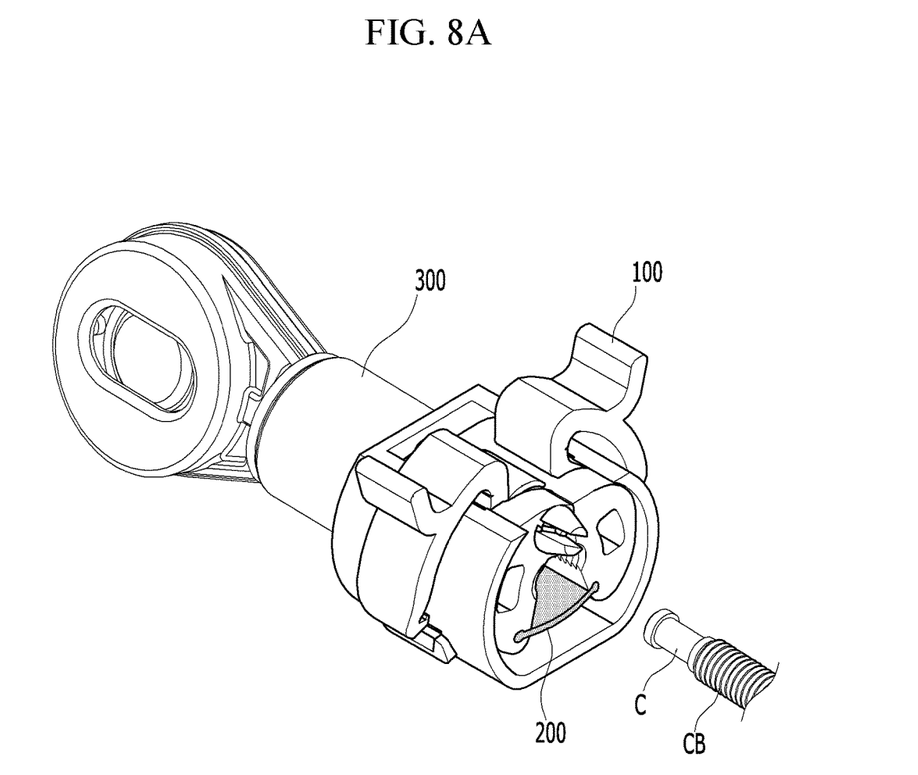
FIG. 8A and FIG. 8B are views illustrating a release state of a transmission cable locking device for vehicles according to an exemplary embodiment of the present invention.
Figure 8B:
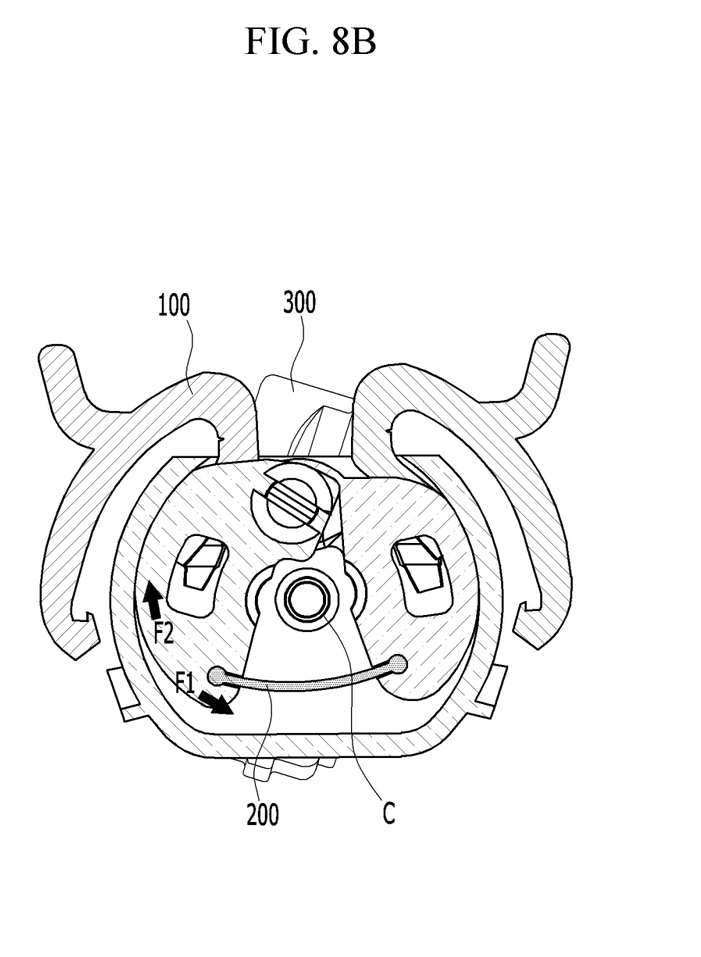
Figure 9A:
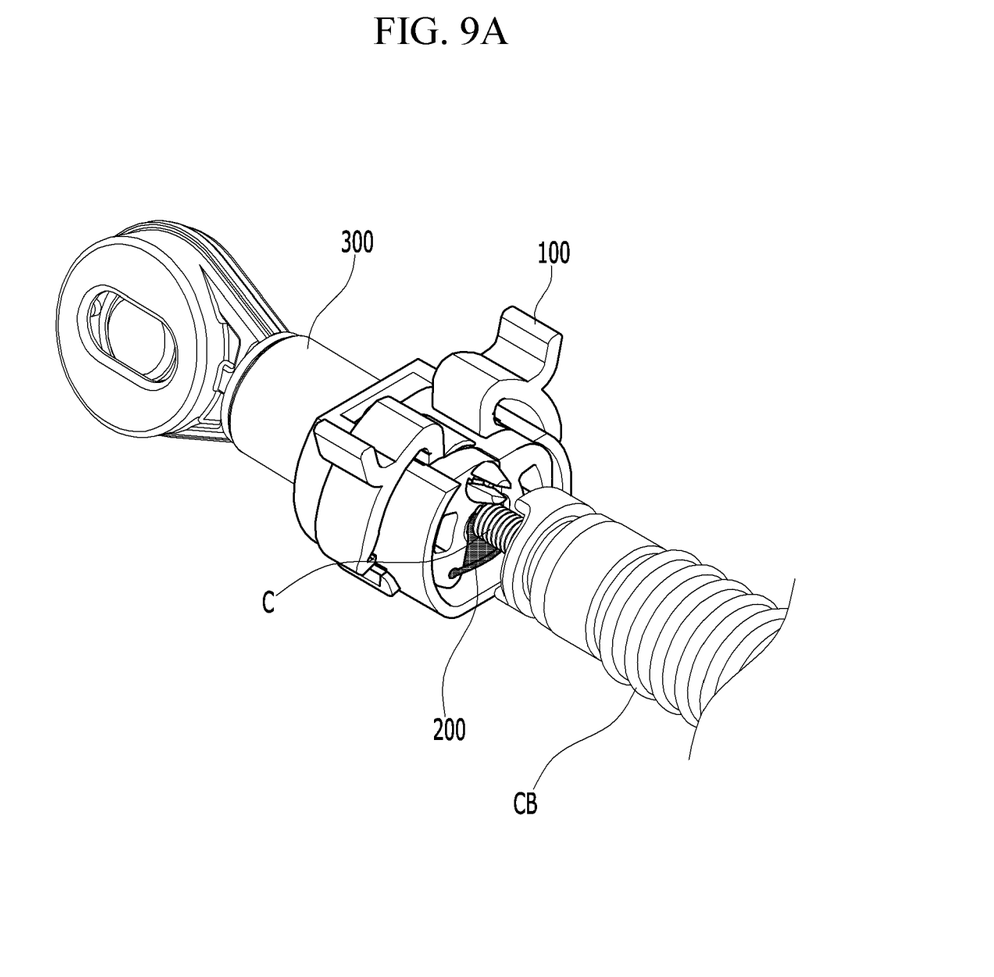
FIG. 9A and FIG. 9B are views illustrating a gripping state of a transmission cable locking device for vehicles according to an exemplary embodiment of the present invention.
Figure 9B:
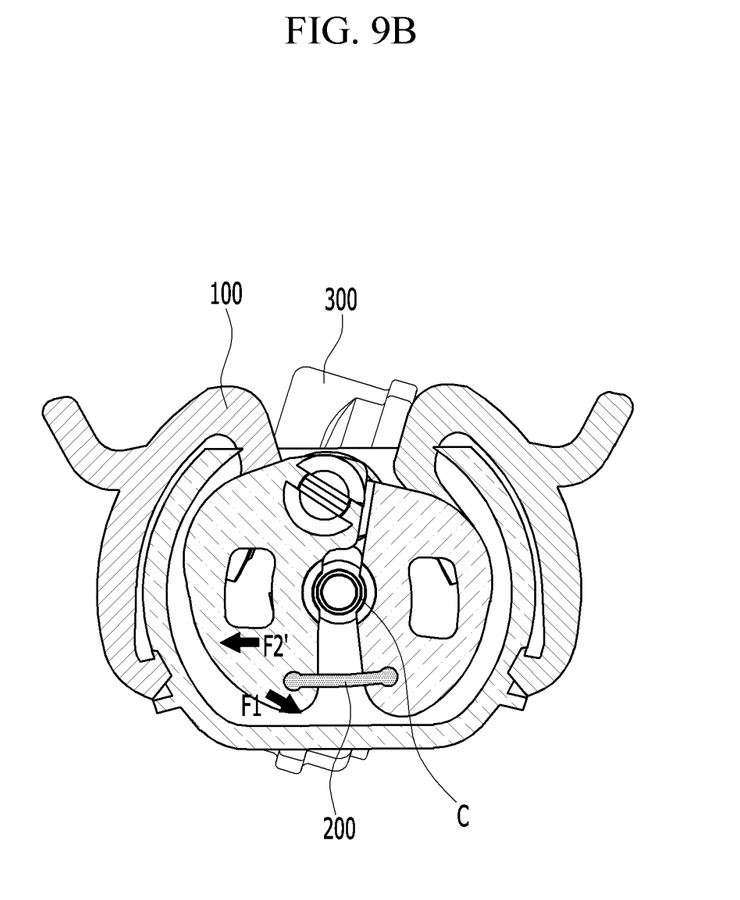

FIG. 8A and FIG. 8B are views illustrating a release state of a transmission cable locking device for vehicles according to an exemplary embodiment of the present invention, and FIG. 9A and FIG. 9B are views illustrating a gripping state of a transmission cable locking device for vehicles according to an exemplary embodiment of the present invention.

Referring to FIG. 8A and FIG. 8B, in a transmission cable C release state of the transmission cable locking device, lower end portions of the locking clips 100 are remote from each other, and tension F1 is applied toward the center portion of the locking band 200. The tension stopper 320 applies pressure F2 wherein the lower end portions of the locking clips are spread in a state that the tension stopper 320 is inserted into the tension groove 150. The pressure F2 that the tension stopper 320 applies to the internal surface of the tension groove 150 is greater than the tension F1 applied to the locking band 200, therefore the engagement portion 140 becomes wide.

Referring to FIG. 9A and FIG. 9B, the user inserts the transmission cable C into the engagement portion 140, adjusts the location of the transmission cable C, and then pushes the handle portion outwardly. The lower end portions of the locking clips 100 becomes close with each other, therefore the engagement portion 140 grips the transmission cable C. At the present time, a tension F1 is still applied at the locking band 200, but the tension stopper 320 escapes from the tension groove 150 to apply force F2' to the upper portion of the locking clips 100 outwardly. The tension F1 toward the center of the locking band 200 is greater than the pressure F2' that the tension stopper 320 contacts the rear surface of the clip core 110 to push the clip core 110 outwardly, therefore the state that the lower end portions of the locking clips 100 are close with each other is maintained. Further, the trapping hook 130 is engaged with the trapping block 300, therefore the locking clips 100 are stably fixed at the housing 300.

As described above, according to an exemplary embodiment of the present invention, the fixation mechanism becomes simple and workability may be improved since the transmission cable may be fixed at the socket by a simple operation.

Also, cost may be reduced by removing an external spring, and noise generation may be prevented during operation.

Also, stability and vehicle performance may be improved by stable fixation between the transmission cable and socket.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission cable locking device for a vehicle, comprising:
    a plurality of opposing locking clips rotating with respect to each other, wherein the rotation determines a grip or release of a transmission cable;
    a locking band disposed between the opposing locking clips and providing interconnecting tension between the opposing locking clips; and
    a housing accommodating the opposing locking clips and the locking band, wherein the opposing locking clips are rotatably coupled in the housing and wherein a hinge shaft is coupled to an internal surface of the housing such that the opposing locking clips are rotatable with respect to the hinge shaft.

2. The transmission cable locking device for the vehicle of claim 1, wherein
    the plurality of opposing locking clips is comprised of:
    a clip core coupled to the hinge shaft;
    a handle portion extended from the clip core and rotatably provided to push and pull the opposing locking clips with respect to each other;
    a trapping hook engaged to an external circumferential surface of the housing to fix the clip core into a position; and
    an engagement portion to fix an external circumferential surface of the transmission cable between the opposing locking clips.

3. The transmission cable locking device for the vehicle of claim 2, wherein a tension groove formed as an opening shape is provided at the clip core to limit a movement range of the opposing locking clips.

4. The transmission cable locking device for the vehicle of claim 3, wherein screw threads are provided at an internal circumferential surface of the engagement portion.

5. The transmission cable locking device for the vehicle of claim 4, wherein
    an end portion of the locking band is inserted into inside of the clip core.

6. The transmission cable locking device for the vehicle of claim 3, wherein the housing includes:
    a socket accommodating the opposing locking clips and the locking band;
    a tension stopper inserted into the tension groove and provided on an internal surface of the socket to be deformed corresponding to the rotation of the opposing locking clips; and
    a trapping block provided at an external circumferential surface of the housing and provided to be engaged with the trapping hook when the opposing locking clips are fixed at the housing.

7. The transmission cable locking device for the vehicle of claim 6, wherein the tension stopper is comprised of an elastic material.

8. The transmission cable locking device for the vehicle of claim 6,
    wherein a pressure that the tension stopper applies to an internal surface of the tension groove is such that the opposing locking clips rotate with respect to each other on the hinge shaft to release the transmission cable is greater than a tension applied to the locking band.

9. The transmission cable locking device for the vehicle of claim 6,
    wherein a pressure that the tension stopper applies to a rear surface of the opposing locking clips is such that the opposing locking clips rotate with respect to each other on the hinge shaft to grip the transmission cable is smaller than a tension applied to the locking band.

10. The transmission cable locking device for the vehicle of claim 1, wherein the locking band is comprised of an elastic material.

11. The transmission cable locking device for the vehicle of claim 1, wherein at a circumference of the hinge shaft,
    an internal elastic member is provided which is elastically deformed such that a predetermined distance between the opposing locking clips and the internal surface of the housing is maintained when the opposing locking clips are coupled to the hinge shaft.

12. The transmission cable locking device for the vehicle of claim 1, wherein at an end portion of the hinge shaft,
    a fixation block is provided so that the opposing locking clips are not released from the hinge shaft when the opposing locking clips are coupled to the hinge shaft.

* * * * *